(No Model.)
W. OLIVER.
APPARATUS FOR GROWING PLANTS.
No. 523,991. Patented Aug. 7, 1894.
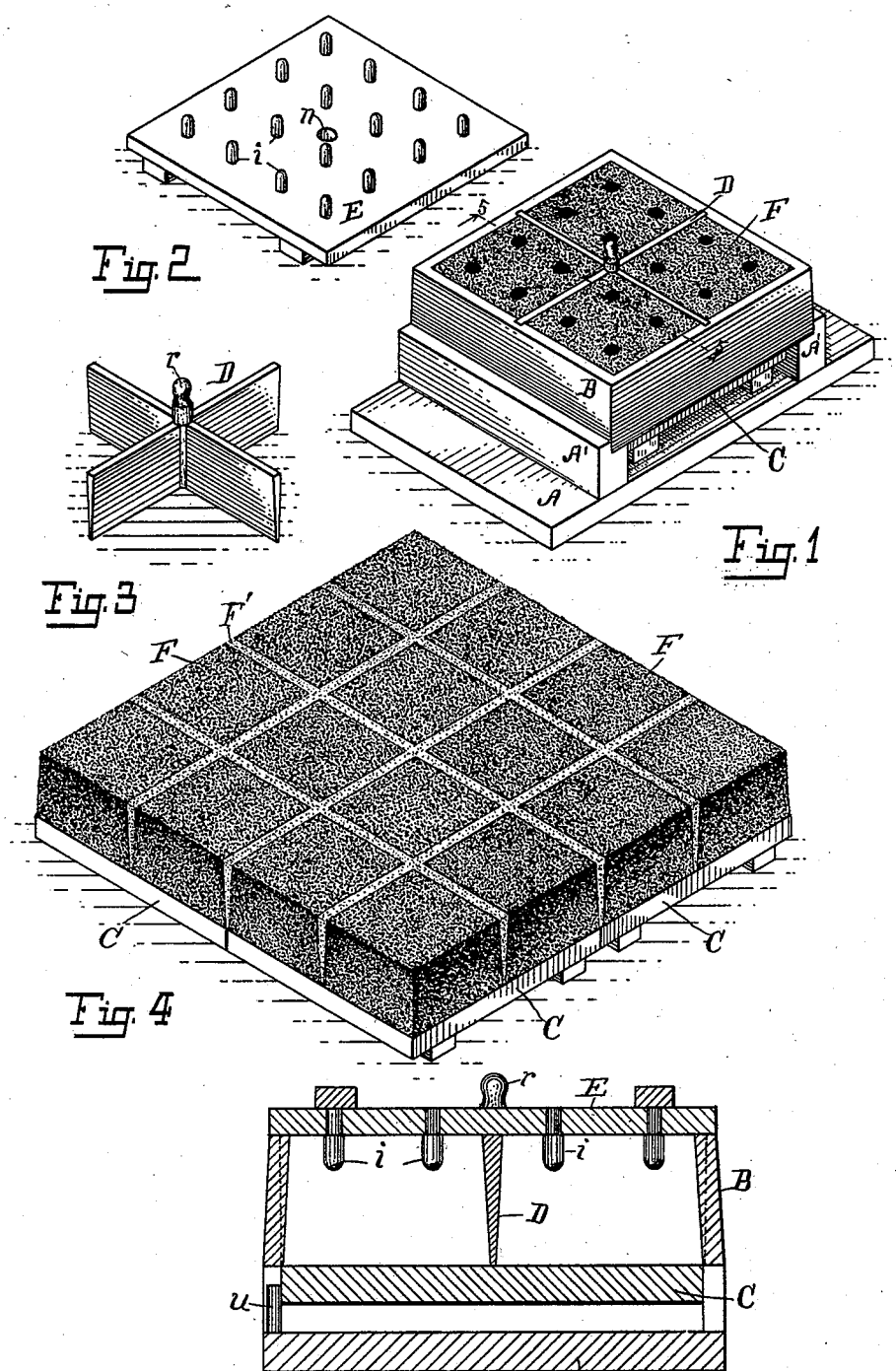
Witnesses:
O. E. Westbroff
E. S. Roos
Inventor.
William Oliver
By Fred L. Chappell
Att'y.

UNITED STATES PATENT OFFICE.

WILLIAM OLIVER, OF ALAMO, MICHIGAN.

APPARATUS FOR GROWING PLANTS.

SPECIFICATION forming part of Letters Patent No. 523,991, dated August 7, 1894.

Application filed November 8, 1893. Serial No. 490,361. (No model.)

*To all whom it may concern:*

Be it known that I, WILLIAM OLIVER, a citizen of the United States, residing in the township of Alamo, in the county of Kalamazoo and State of Michigan, have invented a certain new and useful Apparatus for Growing Plants, of which the following is a specification.

My invention relates to an apparatus and process for growing certain kinds of plants which are too tender to transplant in the usual way, such as water melons and other vines, so that they can be transplanted from the hot house to the open air without injury.

The objects of my invention are, first to dispense with the boxes, paper bags and the like which have heretofore been used for this purpose, and at the same time secure a section of the soil to each plant or to each hill of plants so that it can be transplanted without in the least injuring the roots of the plants; second to grow these plants in such a way as to economize space, and third to grow the plants so that they can all be easily watered without the extra care to give each plant its portion which is required where boxes are used for this purpose.

I accomplish the objects of my invention by the devices shown in the accompanying drawings, in which—

Figure 1, is a perspective view of the apparatus used by me in preparing the soil to receive the seed the top being removed. Fig. 2, is a perspective view of the top E removed and inverted showing the dibble pins *i* which make the holes to receive the seeds. Fig. 3, is a perspective view of the partition D removed from the frame B. Fig. 4, is a perspective view of a number of sections of the prepared earth with the seeds planted, the outside casing to retain it being removed. Fig. 5 is a sectional view on line 5—5 of Fig. 1, the top E being in position and the soil F being removed.

Similar letters of reference refer to similar parts throughout the several views.

In the drawings, A is a base board having transverse cleats A' A'.

C is a square board with cleats on its under side to keep it from warping. B is a box without top or bottom. The inside measure of the bottom of box B is the same as the board C. The insides of the box all slant in from the bottom side so that the top opening is a little smaller all the way around than the bottom. D is the central partition composed of two sections at right angles to each other, a round pin or knob *r* projecting up at the point of intersection to afford a convenient handle. The top side of the partition D is thicker than the lower side and the sides taper evenly.

A board E fits over the top of box B somewhat like a cover, the knob *r* projecting through the hole *n* in the center. From the under side of this top E dibble pegs *i* project down to punch holes in the soil to receive the seed to be planted.

To use my invention a board C is placed in the base A between cleats A' A' and the frame or box B is placed directly above it and retained by suitable means as stop pin *u*. The board C rests between cleats A' A' on the base A; when in this position as shown. The partition D is placed inside the box B, the ends of the sections being adapted to vertical grooves in the middle of each side to retain it securely and to admit of its being easily removed from the box B. After the parts are in position as indicated each of the four sections are filled with soil F, adapted to grow the particular kind of seed to be planted. The soil is only compressed sufficiently to retain its shape. When the box B is full the top E is placed on and pressed down the pins *i* projecting into the soil. This makes the holes for receiving the seed intended to be planted. The seed are then planted. Then the box is given a slight jar by a blow from a hammer or other means to free it and the partition D from close contact with the soil, when the partition D is easily withdrawn owing to its peculiar form and the box B removed also in like manner on account of its form. The board C with the four square cakes of soil with the seeds contained therein is placed side by side with other boards similarly prepared on shelves or tables in a hot house or other protected place. When the number required have been planted a suitable support or frame is put around the outside to retain the dirt of the outside rows. Supports for the outside being common in all green houses, I have deemed it best not to show them as it would interfere with the view of my invention.

When the outside casing is in place the workman should examine the spaces between the boards C and if he finds an opening should crowd a little of the soil F into it to stop it. When these openings are stopped dry quick sand F' should be poured into all the spaces between the cakes of earth. The quick sand between the cakes contains no fertility for the plants and consequently the roots will not penetrate it. It is not tenacious either and watering the plants does not affect it in the least. Consequently when the plants have grown to the size desired and the weather is seasonable the boards C can be taken from the hot house, the sand F' allowing them to separate and be carried to the field where the plants are to mature. The cakes of dirt will be filled with roots which help to retain the dirt and the dirt itself will be considerably packed and will retain its form very well any way. When the boards C are properly distributed over the ground the workmen remove the cakes of dirt from them by means of a little paddle or a knife slipped under them the sand F' between the cakes allowing them to separate freely. Frequently with the hand alone the cakes can be removed without breaking. The plants and cakes of soil around them are placed in furrows in the ground and soil is drawn around them. The plants thrive wonderfully because not a single root has been injured.

When more plants grow in a section or cake of the dirt than are required for a hill the cake can be divided with a knife with very little injury to the plants.

I desire to say that my invention is capable of great variations and is adapted to grow a great variety of plants. The size of the sections of earth is not material and the plan will take the place of putting plants in numerous small pots and is much cheaper.

It is not material to my invention how the spaces between the cakes of earth are formed, and other pulverized non tenacious substances lacking fertility can be substituted for the sand.

Having thus described my invention, what I claim as new, and desire to secure by Letters Patent, is—

1. A seed bed for growing plants to be transplanted, consisting of a number of boards, C, covered with soil, the soil being divided into sections and the sections being separated by quick sand, so that the sections of soil can be removed to the field with the boards, and afterward separated, without disturbing the roots of the plants growing therein.

2. In apparatus for preparing seed beds, the combination of the base, A, having cleats, A', the bottom board, C, the box, B, and the partition, D, substantially as described.

3. In apparatus for preparing seed beds, the combination of the base, A, having cleats, A', the bottom board C, box, B, the partition, D, having knob, $r$, and the top, E, having opening, $n$, adapted to knob, $r$, and downwardly projecting points, $i$, to make openings to receive the seed, substantially as described.

4. In apparatus for preparing seed beds, the combination of a board, C, a box smaller at the top than at the bottom, and the partition, D, thicker at the top than at the bottom, adapted to be set in said box, all substantially as described for the purpose specified.

5. A seed bed consisting of a suitable receptacle, soil filling the receptacle, and partitions of pulverized, nontenacious, insoluble substances dividing the soil into cakes of convenient size.

6. A seed bed for growing plants to be transplanted consisting of a suitable receptacle for the soil, soil filling the receptacle, and partitions of porous, nontenacious, insoluble substances dividing the soil into cakes of convenient size so that the cakes of soil can be removed intact and the plants be transplanted without injury to their roots, for the purpose specified.

In witness whereof I have hereunto set my hand and seal in the presence of two witnesses.

WILLIAM OLIVER. [L. S.]

Witnesses:
 E. S. ROOS,
 C. E. WESTBROOK.